(12) United States Patent
Chen

(10) Patent No.: US 9,442,538 B1
(45) Date of Patent: Sep. 13, 2016

(54) MOBILE RACK WITH LOCK DEVICE

(71) Applicant: Raidon Technology Inc., New Taipei (TW)

(72) Inventor: Sam Chen, New Taipei (TW)

(73) Assignee: RAIDON TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/929,485

(22) Filed: Nov. 2, 2015

(51) Int. Cl.
*E05B 65/00* (2006.01)
*G06F 1/18* (2006.01)

(52) U.S. Cl.
CPC ............... *G06F 1/182* (2013.01); *E05B 65/00* (2013.01); *G06F 1/187* (2013.01); *Y10T 70/5124* (2015.04); *Y10T 70/5544* (2015.04); *Y10T 70/7576* (2015.04)

(58) Field of Classification Search
CPC ........ G06F 1/182; G06F 1/187; E05B 65/00; Y10T 70/5544; Y10T 70/5124; Y10T 70/7576
USPC ....... 70/78, 84–88, 158–164, 169, 173, 360, 70/361; 109/45, 47; 292/DIG. 37; 312/223.2, 332.1; 361/679.57, 679.58, 361/608, 609, 615–617, 724–727, 759, 801
See application file for complete search history.

(56) References Cited

U.S. PATENT DOCUMENTS

| | | | | |
|---|---|---|---|---|
| 2,399,812 A | * | 5/1946 | Ledin ....................... | E05B 65/44 292/DIG. 37 |
| 3,930,388 A | * | 1/1976 | Barras .................... | B60K 15/05 220/210 |
| 3,964,280 A | * | 6/1976 | Kelton .................... | E05B 57/00 70/237 |
| 5,691,879 A | * | 11/1997 | Lopez ................... | E05B 63/143 312/219 |
| 6,288,902 B1 | * | 9/2001 | Kim ....................... | G11B 33/08 206/701 |
| 6,891,723 B1 | * | 5/2005 | Lin ........................ | G11B 33/025 312/223.1 |
| 6,925,843 B1 | * | 8/2005 | Pols Sandhu ........... | E05B 65/46 361/726 |
| 7,350,384 B2 | * | 4/2008 | Teratani .................. | E05B 11/04 70/159 |
| 8,988,821 B2 | * | 3/2015 | Li ........................... | G06F 1/187 360/99.15 |
| 2006/0250777 A1 | * | 11/2006 | Chen ........................ | G06F 1/26 361/727 |
| 2009/0016012 A1 | * | 1/2009 | Huang ................ | E05B 73/0082 361/679.33 |
| 2009/0268412 A1 | * | 10/2009 | Lee ......................... | G06F 1/181 361/726 |
| 2010/0284145 A1 | * | 11/2010 | Kang ...................... | G06F 1/181 361/679.58 |
| 2010/0302722 A1 | * | 12/2010 | Kang ................... | G11B 33/124 361/679.31 |
| 2011/0304960 A1 | * | 12/2011 | Lu ........................... | G06F 1/187 361/679.01 |
| 2012/0235002 A1 | * | 9/2012 | Zhang ..................... | G06F 1/187 248/309.1 |

* cited by examiner

*Primary Examiner* — Lloyd Gall
(74) *Attorney, Agent, or Firm* — Jackson IPG PLLC; Demian K. Jackson

(57) ABSTRACT

A mobile rack includes a releasable casing including a front wall having opening elements; a frame member secured to the front wall and including an opening member aligned with the opening elements, a recess at a second side, and a well between the recess and the opening member; a spring-actuated door having a first side hingedly secured to a first side of the frame member and including an opening aligned with the opening member, and a latch at a second side; a spring-actuated lock activation mechanism including a key hole, a hollow shank aligned with the key hole, and a hollow lock element put on a rear portion of the hollow shank and having a projection on a first side; and a spring-actuated auxiliary lock mechanism pivotably secured to the second side of the frame member and including a hook in the well, and an extension.

1 Claim, 3 Drawing Sheets

MOBILE RACK WITH LOCK DEVICE

BACKGROUND OF THE INVENTION

1. Field of the Invention

The invention relates to mobile racks for hard disk drive, solid state drive (HDD & SSD) and more particularly to such a mobile rack having an improved lock device.

2. Description of Related Art

Mobile racks have been widely used for holding a HDD/ SSD. Conventionally, such a mobile rack comprises a sleeve and a member slidably disposed in the sleeve. After insertion of the member into the sleeve, the member is required to be locked to prevent it from falling out of the sleeve together a certain degree of security from data stolen by the use of a lock device.

While the device enjoys its success in the market, continuing improvements in the exploitation of mobile rack having a with lock device are constantly sought.

SUMMARY OF THE INVENTION

It is therefore one object of the invention to provide a mobile rack comprising a casing including a front wall having a plurality of opening elements; a frame member secured to the front wall and including an opening member aligned with the opening elements, a recess at a second side, and a well between the recess and the opening member; a spring-actuated door having a first side hingedly secured to a first side of the frame member and including an opening aligned with the opening member, and a latch on an inner surface at a second side; a spring-actuated lock activation mechanism including a key hole, a hollow shank aligned with the key hole and passing through the recess, and a hollow lock element put on a rear portion of the hollow shank and having a projection on a first side; and a spring-actuated auxiliary lock mechanism pivotably secured to the second side of the frame member and including a hook disposed in the well, and an extension; wherein in a locked state of the door, the hook and the latch are fastened together, and the hook is fastened by the projection; wherein in response to pressing the auxiliary lock mechanism, the auxiliary lock mechanism pivots to unfasten the hook and unlock the latch, thereby opening the door; and wherein in response to clockwise turning both the hollow shank and the lock element, the projection fastens the hook which in turn fastens the latch, thereby locking the door.

The above and other objects, features and advantages of the invention will become apparent from the following detailed description taken with the accompanying drawings.

DETAILED DESCRIPTION OF THE INVENTION

Figure 1:
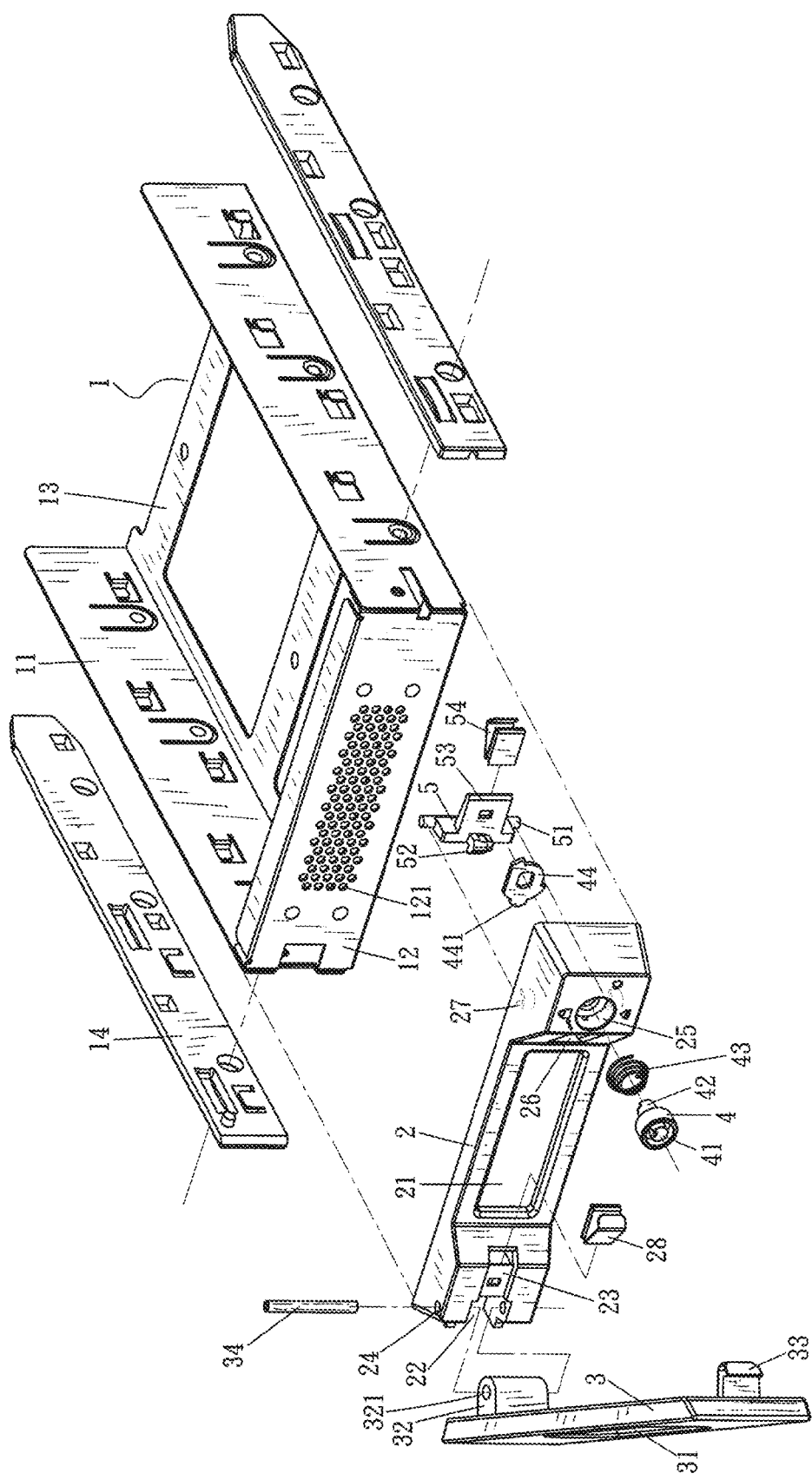
FIG. 1 is an exploded view of a mobile rack according to the invention.
Figure 2:
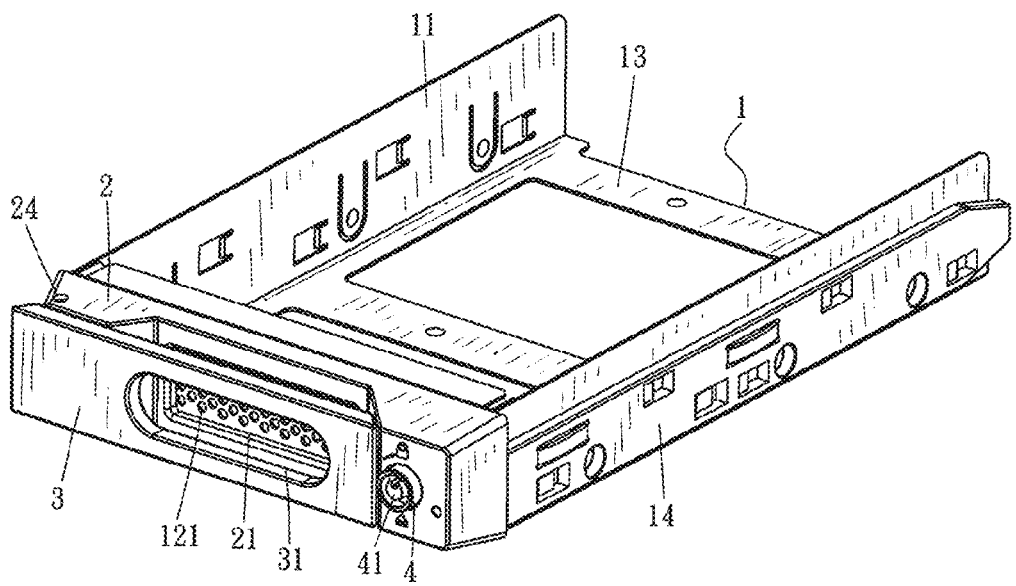
FIG. 2 is a perspective view of the assembled mobile rack.
Figure 3:
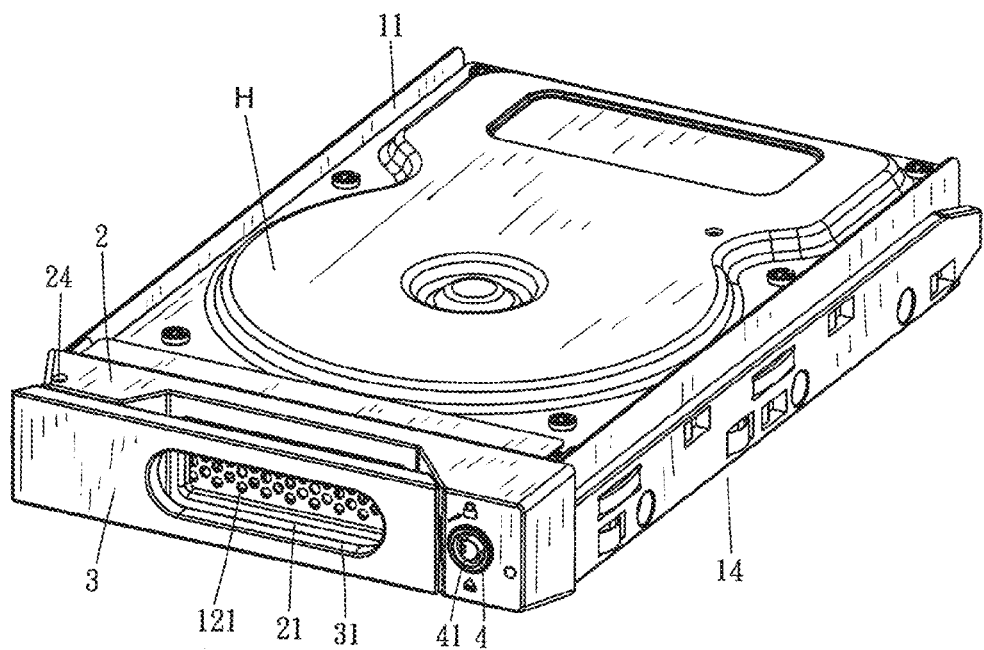
FIG. 3 is a perspective view of the mobile rack with a HDD disposed therein.
Figure 4:
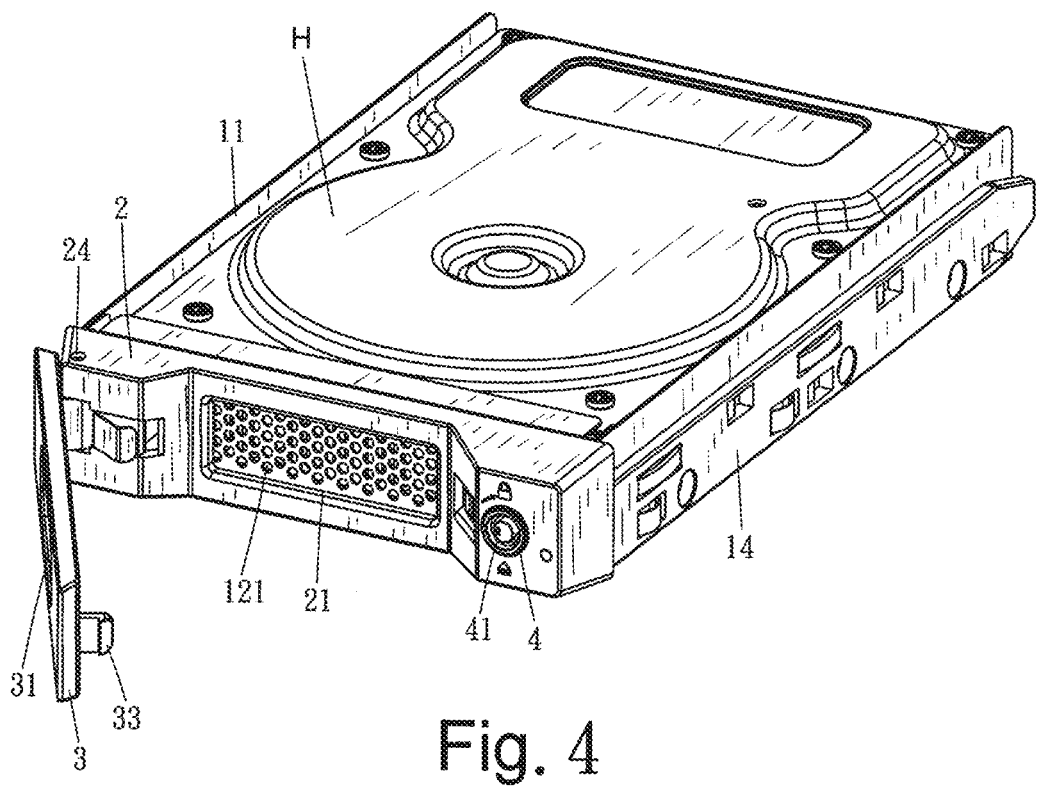
FIG. 4 is a view similar to FIG. 3 with the door open.

Referring to FIGS. 1 to 5, a mobile rack with lock device in accordance with the invention comprises a casing 1, a frame member 2, a door 3, a lock activation mechanism 4, and an auxiliary lock mechanism 5 as discussed in detail below.

The casing 1 has a rectangular cross section and includes two opposite sides 11, a front wall 12 having a plurality of openings 121 for dissipating heat, a space 13 defined by the sides 11 and the wall 12 for receiving and holding a HDD H, and two slides 14 mounted on outer surfaces of the sides 11 respectively. The frame member 2 is secured to the wall 12 and includes an intermediate, rectangular opening 21 aligned with the openings 121, a cavity 22 at one side, a depression 23 between the cavity 22 and the opening 21, two aligned through holes 24 communicating with the cavity 22, a circular recess 25 at the other side, a well 26 between the recess 25 and the opening 21, upper and lower bearings 27 on an inner surface adjacent to the recess 25, and a resilient member 28 mounted in the depression 23.

The door 3 includes an oval opening 31 aligned with the opening 21, a boss 32 on an inner surface at one side and disposed in the cavity 22, a through hole 321 through the boss 32, a pivot pin 34 driven through one through hole 24, the through hole 321, and the other through hole 24 to pivotably fasten the door 3 and the frame member 2 together, and a latch 33 on the inner surface at the other side. The lock activation mechanism 4 includes a key hole 41, a rear hollow shank 42 aligned with the key hole 41 and passing through the recess 25, a torsion spring 43 put on the shank 42 and anchored in the recess 25, and a hollow lock element 44 put on a rear portion of the shank 42 and having a projection 441 on one side. The auxiliary lock mechanism 5 includes upper and lower rods 51 disposed in the bearings 27 respectively, a hook 52 disposed in the well 26, a holed extension 53, and a resilient member 54 secured to the extension 53.

In a locked state of the door 3, the hook 52 and the latch 33 are fastened together, and the hook 52 is locked by the projection 441. A user may press the lock activation mechanism 4 to move the shank 42. And in turn, the lock element 44 is pushed inward to press the resilient member 54. And in turn, the auxiliary lock mechanism 5 pivots to unlock the hook 52. The latch 33 is also unlocked. Finally, the resilient member 28 releases the stored elastic force to open the door 3 (see FIG. 4).

Figure 5:
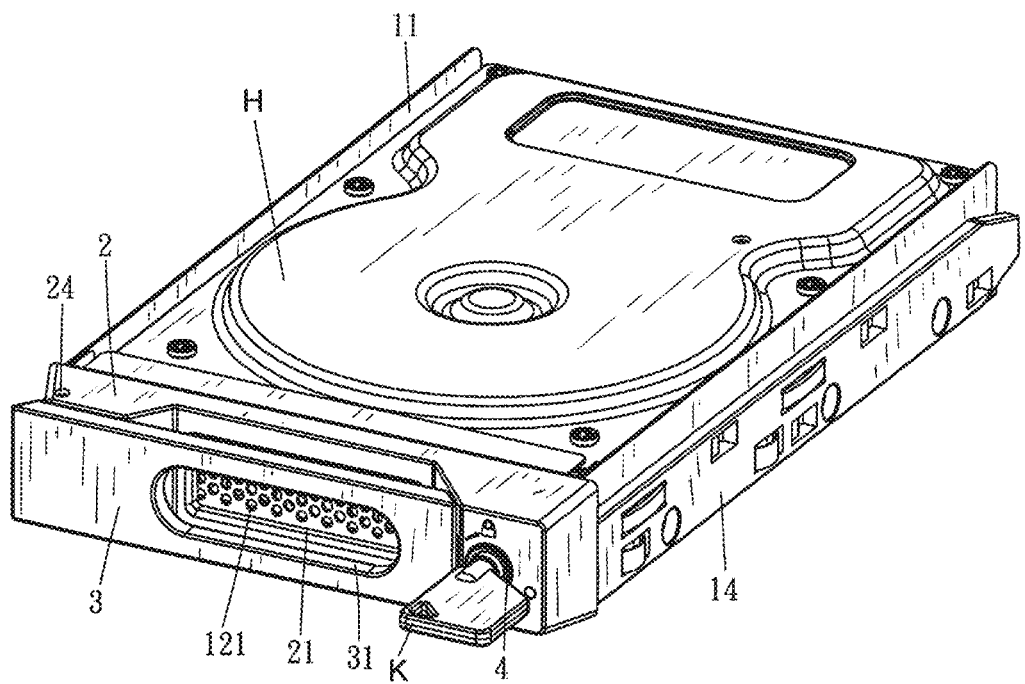
FIG. 5 is a view similar to FIG. 4 showing the door has been locked by using a key.

As shown in FIG. 5, the user may insert a key K into the key hole 41 to clockwise turn the shank 42 and the lock element 44. And in turn, the projection 441 fastens the hook 52 which in turn fastens the latch 33. As a result, the door 3 is locked. The mobile rack is thus prevented from being removed out of a personal computer (PC).

While the invention has been described in terms of preferred embodiments, those skilled in the art will recognize that the invention can be practiced with modifications within the spirit and scope of the appended claims.

What is claimed is:

1. A mobile rack comprising:

a releasable casing including a front wall having a plurality of opening elements;

a frame member secured to the front wall and including an opening member aligned with the opening elements, a recess at a second side, and a well between the recess and the opening member;

a spring-actuated door having a first side hingedly secured to a first side of the frame member and including an opening aligned with the opening member, and a latch on an inner surface at a second side;

a spring-actuated lock activation mechanism including a key hole, a hollow shank aligned with the key hole and passing through the recess, and a hollow lock element put on a rear portion of the hollow shank and having a projection on a first side; and a spring-actuated auxiliary lock mechanism pivotably secured to the second side of the frame member and including a hook disposed in the well, and an extension;

wherein in a locked state of the door, the hook and the latch are fastened together, and the hook is fastened by the projection;

wherein in response to pressing the lock activation mechanism, the auxiliary lock mechanism pivots to unfasten the hook and unlock the latch, thereby opening the door; and wherein in response to clockwise turning both the hollow shank and the lock element, the projection fastens the hook which in turn fastens the latch, thereby locking the door.

\* \* \* \* \*